United States Patent [19]

Chastine

[11] Patent Number: 4,643,386
[45] Date of Patent: Feb. 17, 1987

[54] HOUSEHOLD REFRIGERATOR COMPRESSOR VIBRATION ISOLATOR

[75] Inventor: Gary L. Chastine, Louisville, Ky.

[73] Assignee: General Electric Company, Louisville, Ky.

[21] Appl. No.: 672,071

[22] Filed: Nov. 16, 1984

[51] Int. Cl.$^4$ .................................................. F16M 13/00
[52] U.S. Cl. ...................................... 248/632; 248/634; 248/638; 248/678; 310/91
[58] Field of Search .............. 248/632, 634, 638, 615, 248/619, 621, 678, 310, 311.2; 310/91

[56] References Cited

U.S. PATENT DOCUMENTS

| | | | |
|---|---|---|---|
| 2,661,943 | 12/1953 | Wilbur | 248/632 X |
| 3,130,964 | 4/1964 | Johnson | 248/621 X |
| 3,436,102 | 4/1969 | Shelly | 248/903 |
| 3,944,181 | 3/1976 | Anthony | 248/634 |
| 4,461,446 | 7/1984 | Hannibal et al. | 248/634 |
| 4,493,471 | 1/1985 | McInnis | 248/619 X |

FOREIGN PATENT DOCUMENTS

| | | | |
|---|---|---|---|
| 922107 | 5/1947 | France | 248/678 |
| 362808 | 12/1931 | United Kingdom | 248/310 |

Primary Examiner—Robert W. Gibson, Jr.
Assistant Examiner—David L. Talbott
Attorney, Agent, or Firm—Frank P. Giacalone; Radford M. Reams

[57] ABSTRACT

A high side portion of a refrigeration system is supported on a support member which includes a drop-in rotary compressor mounting arrangement wherein the compressor is resiliently supported in a containment area with its axis in a vertical position. The mounting arrangement includes a vibration isolating support member located in the containment area having a plurality of spring cylinders which when interposed between the compressor and support member results in a desirable bulging of the cylinder walls which provides torsional and vertical vibration isolation of the compressor.

5 Claims, 10 Drawing Figures

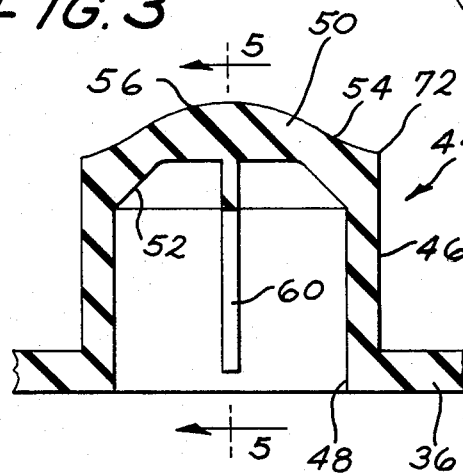
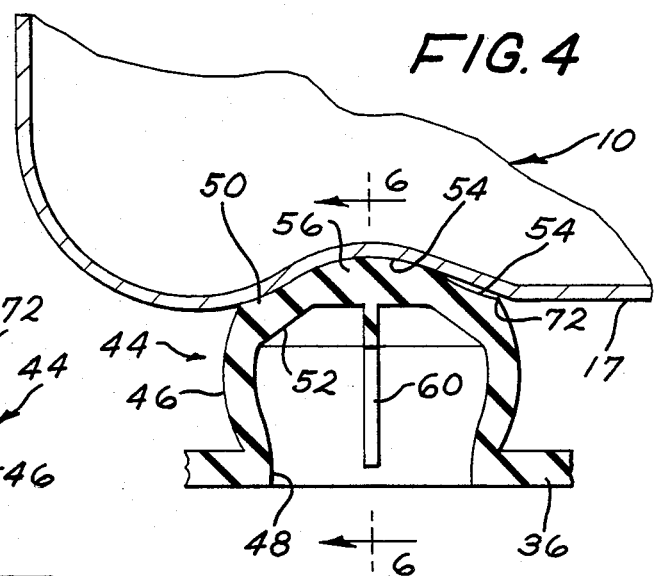
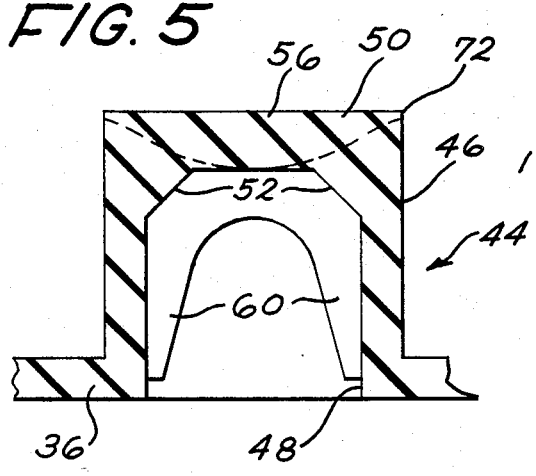
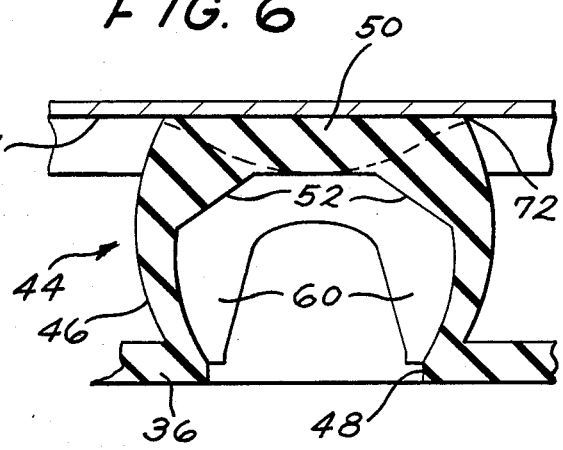
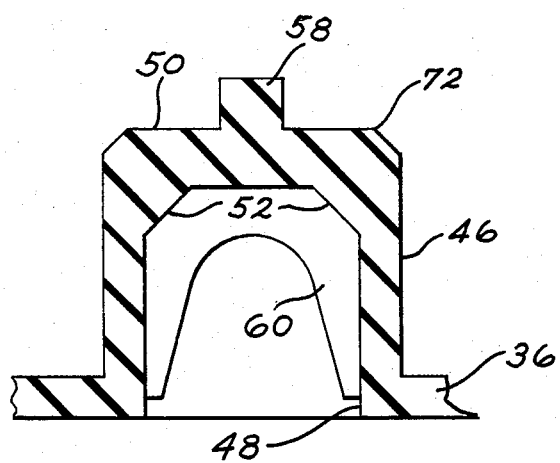
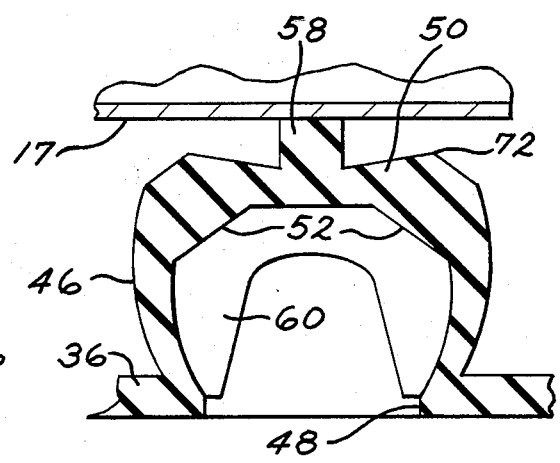

HOUSEHOLD REFRIGERATOR COMPRESSOR VIBRATION ISOLATOR

BACKGROUND OF THE INVENTION

By the present invention a rotary compressor vibration isolation means is provided which affords both torsional and vertical vibration isolation of the compressor in combination with a support which includes a containment area in which the compressor is resiliently mounted in its upright position.

It has been common practice to support the motor compressor on a series of circumferentially spaced posts including resilient means interposed between the base on which the compressor is located and supporting legs secured to the motor compressor casing. The supports are usually secured to the compressor casing such as by welding. This procedure of welding supports to the casing may result in a slight deformation of the compressor casing. Since the compressor casing is customarily sized to securely hold the compressor and motor, any distortion of casing dimensions can result in compressor misalignment relative to the casing. Accordingly, the compressor casing must be measured and resized to insure a proper vertical alignment of the motor and rotary compressor relative to the casing. Further, the presence of supporting legs projecting from the compressor casing would interfere with some automatic assembly operations.

SUMMARY OF THE INVENTION

Accordingly, it is an object of the present invention to provide a drop-in resilient compressor mounting arrangement adapted to receive the compressor. By the present invention, a rotary motor compressor vibration isolator is provided which provides both torsional and vertical vibration isolation which allows a simple drop-in installation of the compressor. A household refrigerator apparatus is provided having means forming a compartment to be refrigerated and means forming an equipment compartment for housing a unitary removable refrigerating apparatus forming the high side portion of a refrigeration system including a compressor having a side wall connected by bottom and top walls and a compressor support member arranged in said equipment compartment having a bottom wall, means mounting the compressor on the bottom wall of the support member comprising an upwardly extending disposed wall on the bottom wall which defines a compressor support containment area. A resilient compressor support member is provided which is dimensioned to be received in the compressor support containment area of the support member. The compressor support member is formed to include a plurality of spring cylinders which when interposed between the compressor bottom wall and the support member results in a desirable bulging of the cylinder walls to provide torsional and vertical vibration isolation of the compressor.

BRIEF DESCRIPTION OF THE DRAWINGS

FIG. 3 is a vertical sectional view taken along line 3—3 of FIG. 2 showing a portion of the mounting member;

FIG. 4 is a view similar to FIG. 3 showing a portion of the compressor on the mounting member;

FIG. 5 is an elevational view in section taken along line 5—5 of FIG. 3;

FIG. 6 is an elevational view in section taken along line 6—6 of FIG. 4;

FIG. 7 is a view similar to FIG. 5 showing another embodiment of the invention;

FIG. 8 is a view showing the embodiment of FIG. 7 with the compressor on the mounting member;

DESCRIPTION OF THE PREFERRED EMBODIMENT

Figure 1:
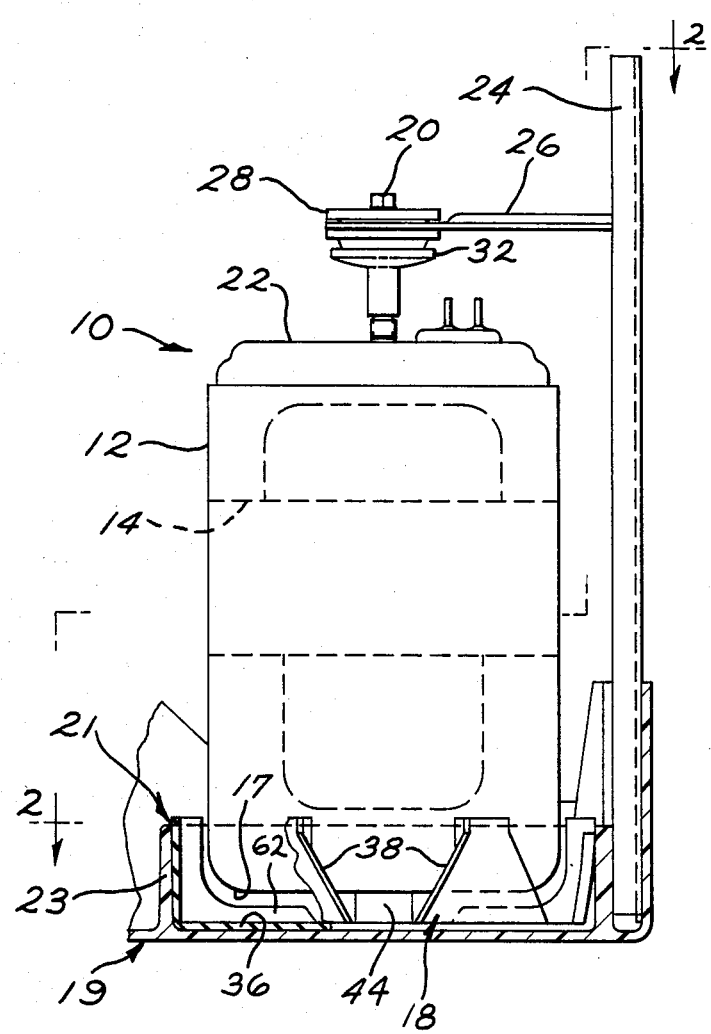
FIG. 1 is an elevational view of a vertically mounted hermetic compressor incorporating the preferred embodiment of the present resilient mounting arrangement.

Referring now to the drawings, wherein a preferred embodiment of the invention has been shown and particularly to FIG. 1, the basic components of the refrigerant hermetic motor compressor assembly 10 are of conventional construction and include an outer cylindrical casing 12 including an upper wall 22 and a bottom wall 17. Arranged in casing 12 is a motor compressor unit comprising an upper motor section 14 and a lower compressor section 16. As shown in FIG. 1 the compressor casing 12 is mounted in its vertical position and supported on a bottom or support member 19. The casing 12 of the compressor is arranged with its lower portion and more specifically its bottom wall 17 located on a resilient mounting member 18. The member 18, which incorporates the present invention and will be explained fully hereinafter, is positioned in a containment area 21 defined by a wall 23 extending upwardly from the base wall of the bottom member 19. To insure the vertical stability of the compressor casing 12 means are provided to support the casing at its upper end. To this end, the compressor is provided with a stud 20 extending upwardly from and secured to the upper wall 22 of the compressor casing 12. A support structure is provided which includes a post 24 supported on the member 19 in a vertical position. A cantilevered arm 26 extends perpendicular to the vertical post 24 to a position where it overlies the compressor and more particularly the stud 20. Located on the arm 26 is a resilient grommet 28 having an opening (not shown) which axially aligns with the stud 20. The grommet 28 is dimensioned to seat in a convex side of a disk-shaped spacer 32 which is secured to the stud 20. With the compressor in its installed or operating position the stud 20 is arranged in a cooperating opening (not shown) of grommet 28 to thereby stabilize the vertical axis of the compressor.

Figure 2:
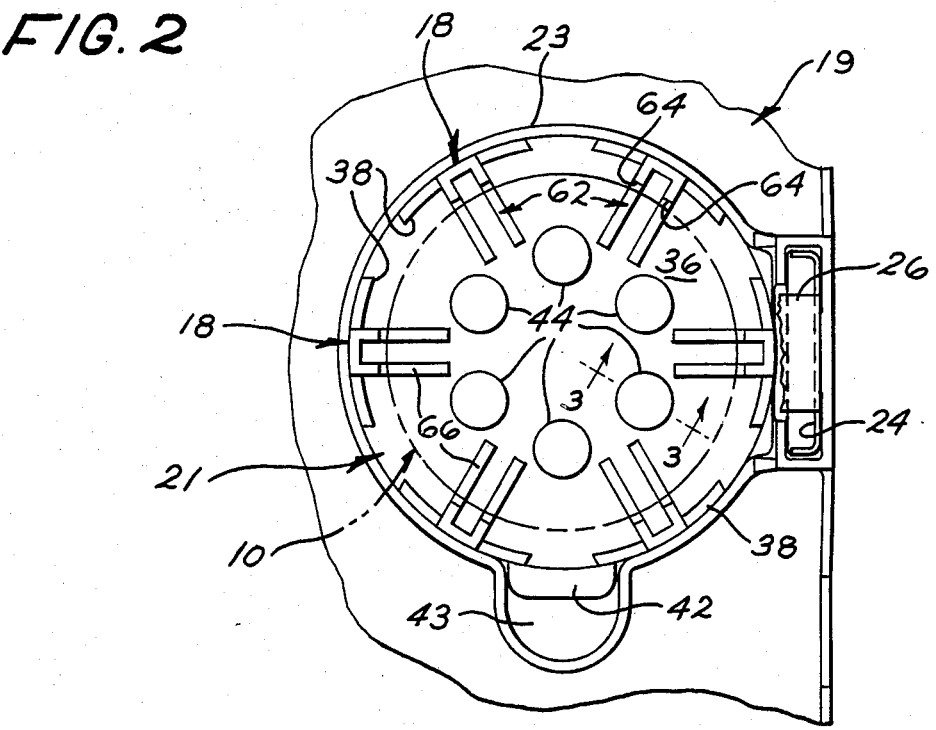
FIG. 2 is a plan view taken along line 2—2 of FIG. 1 with the compressor removed to show details of the mounting member.
Figure 10:
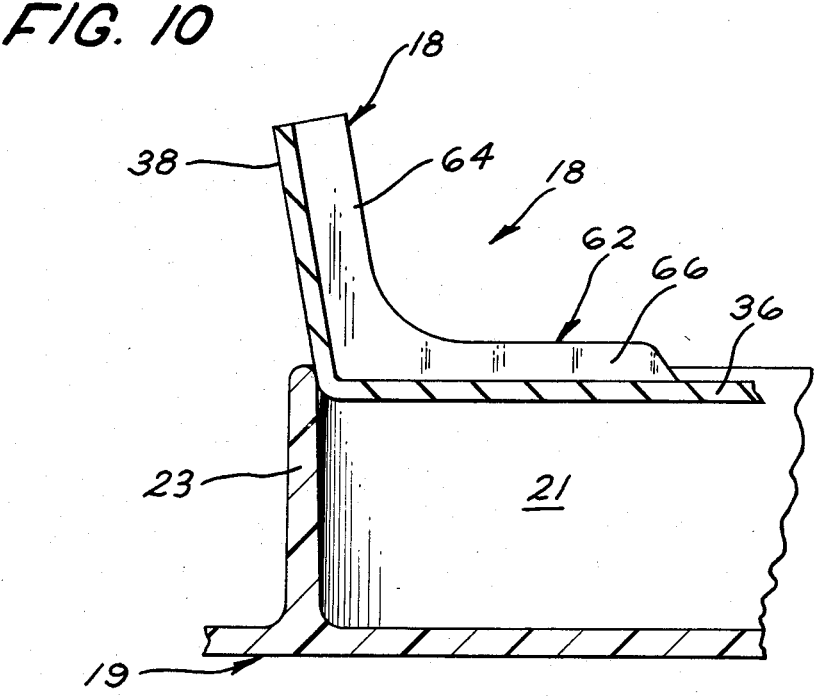
FIG. 10 is an enlarged sectional view showing certain details of the mounting member.

In accordance with the embodiment shown and described herein the resilient support member 18 is a one-piece structure molded from a resilient material such as rubber. The support member includes a base wall portion 36 which is dimensioned to be received in the containment area 21. Formed along the edge portions of wall 36 are a plurality of circumferentially spaced upwardly extending wall sections 38 which as shown in FIGS. 1, 2 and 10 engage the wall 40 defining the containment area 21. In some instances it may be necessary to transport the bottom member 19 with the mounting member 18 assembled in the containment area. To insure that the member 18 is not dislodged from its position in the containment area means are provided which maintains firm contact between the wall sections 38 of member 18 and the containment area wall 23. To this end, as shown in FIG. 10, the walls 38 are molded so as to be biased radially outwardly from the perpendicular approximately between 5 and 10 degrees. This biasing of wall sections 38 outwardly provides a holding force between wall sections 38 and wall 23 when member 18 is arranged in containment area 21. To prevent radial movement of member 18 relative to the base 19 by the torsional forces created by the compressor there is provided a tab portion 42 (FIG. 2). The tab 42 extends radially outwardly from the base wall 36 and is positioned in an opening 43 in the containment area wall 23. To provide both vertical and torsional resistance to the compressor force there is formed on the resilient support member 18 and extending upwardly from its base wall 36 a plurality of circumferentially arranged hollow spring cylinders 44. The circumferential side wall 46 of spring cylinders 44 extend from a lower open end 48 in wall 36 to an upper end provided with a cover portion 50. The diameter of the circumference in which the spring cylinders 44 are arranged on the base wall 36 is smaller than that of the compressor casing and accordingly the compressor through its bottom wall 17 is supported on the cover portion 50 of each of the cylinders 44 as shown in FIGS. 4 and 6.

Referring to FIGS. 4 and 6 it will be seen that when the compressor exerts a vertical force on the cylinder it will cause the cylinder walls to compress and bulge outwardly. In an optimal configuration the forces will cause the walls to form a barrel shape cross-section as shown in FIGS. 4, 6 and 8. In order for the cylinders to remain stable under both vertical and particularly torsional forces they should deform with the upper diameters remaining smaller than that of the bulged area. Depending on the magnitude of the vertical force, the thickness of the cylinder walls and the resiliency of the material the cylinder walls may mushroom at their upper end rather than bulging out in an area spaced from the cover 50. The mushrooming of a cylinder at its upper end, if allowed, will cause some of the vertical force to be distributed on the cover portion 50 in an area beyond the radial dimension of the cylinder. The forces when acting in the mushroomed area outside of the dimension of the cylinder will cause the cylinder to become unstable. In effect mushrooming of the upper portion of the cylinder, if permitted, would have a detrimental effect on stabilizing both the torsional and vertical forces and accordingly the integrity of the mounting system.

By the present invention means are provided to insure that when a vertical force is applied to the cylinder by the compressor that the diameter of the cover portion remains within the diameter defined by the bulged area. Referring to FIGS. 3–8 it will be seen that formed in the interior of the cylinder at the junction of the cylinder wall and the cover is a circumferential enlargement or chamfer 52. In this configuration, as shown in FIGS. 4, 6 and 8, when the vertical force as applied by the compressor compresses the cylinder 44, the extra thickness and stiffness added by the circumferentially disposed chamfer 52 causes these vertical forces to be exerted to the side walls at a location spaced below the cover 50. This transfer of forces to a portion of the cylinder walls below the cover portion prevents the upper ends of the cylinder walls from spreading beyond the dimension of the diameter of the bulged area. In which event the cylinder as explained above becomes relatively unstable to vertical forces.

Figure 9:
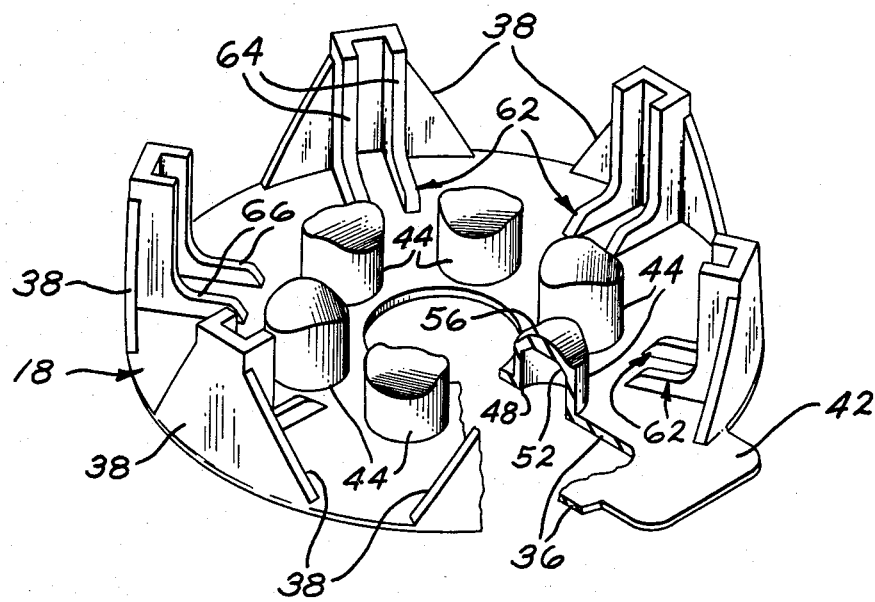
FIG. 9 is an enlarged perspective showing details of the mounting member.

In the present embodiment the bottom wall 17 of the compressor casing is formed to include circumferentially disposed indentation or valley 54 as shown in FIG. 4. In order to provide maximum contact with the bottom wall 17 the upper or cover portion 50 of cylinders 44 are formed to include a raised portion 56 which is dimensioned to be received in the valley 54. Each of the raised portions 56, as shown in FIG. 9, form a curved segment of a circle generated from the center of member 18 which is substantially equal to that of the valley 54 so that the portions 56 mate with the circumferentially disposed valley 54.

In the embodiment of the invention as shown in FIGS. 7 and 8 there is provided another system of preventing mushrooming of the cylinder side walls. This configuration may be more suitable for use with a compressor having a relatively flat bottom wall. To this end, the upper cover portion 50 is formed to include a centrally arranged projection 58 which extends upwardly from portion 50. In this instance, in relation to a flat bottom compressor wall, the vertical force of the compressor through projection 58 deflects the wall 50 centrally. This action or downwardly deflection of the center or cover portion 50 by projection 58 as shown in FIG. 8 tends to draw the upper circumferentially disposed edge 72 of cylinder 44 inwardly, thereby causing the cylinder wall 46 to bulge at a location below the upper edge 72 of the cylinder.

Depending on the capacity of the compressor to generate vertical and torsional forces and other parameters, such as the type of material the member 18 is formed of and the thickness of the cylinder walls, it may be necessary to provide means to further insure the resistance of the cylinders to torsional forces. To this end, the torsional stability of the cylinder may be enhanced by the addition of a rib 60 formed in the interior of the cylinder 44. The ribs 60, when the cylinders are viewed in FIG. 2, are arranged to extend in a circumferential direction as shown in dotted lines. This circumferential orientation of the ribs 60 provides a resistance of the cylinders 44 which stabilizes the torsional forces.

Means are also provided by the present invention whereby bottoming out of the compressor is prevented in extreme instances or the failure of the cylinder. To this end, a pair of ribs 62 are formed on members 18 which include a vertical portion 64 extending radially inwardly from the wall portions 38 and a horizontal portion 66 extending along the bottom wall 36 a distance sufficient to be positioned below the compressor bottom wall. The horizontal portions 66 of ribs 62 provide a backup in the event extraordinary vertical forces cause a collapse of the cylinder 44. During shipping or if the appliance in which the compressor is assembled is dropped the compressor may contact the ribs 66. In this instance the ribs 66 will provide adequate damping of the vertical forces.

It should be apparent to those skilled in the art that the embodiment described heretofore is considered to be the presently preferred form of this invention. In accordance with the Patent Statues, changes may be made in the disclosed apparatus and the manner in which it is used without actually departing from the true spirit and scope of this invention.

What is claimed is:

1. A resilient support for mounting a hermetic motor compressor on a bottom member, said compressor including a bottom wall providing a support surface, upwardly extending wall portions on said bottom member defining a compressor support containment area, a one-piece resilient compressor support member dimensioned to be received in said compressor support containment area comprising:
   a base wall conforming substantially to said containment area;
   spaced resilient wall portions extending upwardly from the edge portion of said base wall engaging said wall portions of said containment area defining said compressor support containment area;
   a plurality of cylindrically shaped spring cylinders extending upwardly from said base wall including side walls extending upwardly from an open end in said base wall to an upper end; and
   a cover portion formed on the upper end of said spring cylinders dimensioned to engage said bottom wall of said compressor for resiliently supporting said compressor support surface in spaced relationship to said bottom member including means interacting between said cover portion and said side walls whereby movement of said compressor relative to said bottom member causes said cylinder side walls to bulge outwardly and a resistance to movement of said spring cylinders which provides both torsional damping and axial damping of said compressor.

2. The resilient support for mounting a hermetic motor compressor recited in claim 1 further including a continuous chamfer formed in the interior of said spring cylinder at the junction of said cylinder side walls and said cover portion so that at least a portion of the axial forces applied by said compressor is transmitted to said side walls at a location below said cover portion to assist said bulging of said cylinder side walls at said location.

3. The resilient support for mounting a hermetic motor compressor nested in claim 1 further including a rib member formed in the interior of said cylinder dimensioned to transfer axial forces exerted by said compressor to said side walls at a location below said cover portion to assist said bulging of said cylinder side walls at said location.

4. The resilient support for mounting a hermetic motor compressor recited in claim 1 further including a central projection in said cover portion whereby axial force applied by said compressor will cause the center of said cover portion to be depressed, thereby transferring said force to said side walls at a location below said cover portion.

5. The resilient support for mounting a hermetic motor compressor recited in claim 3 wherein said resilient space wall portions are formed in an outwardly biased position so as to insure forced contact between said spaced wall portions and said resilient wall portions.

* * * * *